US008929916B2

(12) United States Patent
Gordon

(10) Patent No.: US 8,929,916 B2
(45) Date of Patent: Jan. 6, 2015

(54) SYSTEM, METHOD AND DATABASE FOR DETERMINING LOCATION BY INDIRECTLY USING GPS COORDINATES

(71) Applicant: Absolute Software Corporation, Vancouver (CA)

(72) Inventor: William Doyle Gordon, Vancouver (CA)

(73) Assignee: Absolute Software Corporation, Vancouver, British Columbia (CA)

( * ) Notice: Subject to any disclaimer, the term of this patent is extended or adjusted under 35 U.S.C. 154(b) by 47 days.

(21) Appl. No.: 13/891,046

(22) Filed: May 9, 2013

(65) Prior Publication Data

US 2013/0303186 A1 Nov. 14, 2013

Related U.S. Application Data

(60) Provisional application No. 61/645,179, filed on May 10, 2012.

(51) Int. Cl.
*H04W 24/00* (2009.01)
*H04W 64/00* (2009.01)
*G01S 5/02* (2010.01)

(52) U.S. Cl.
CPC . *H04W 64/00* (2013.01); *G01S 5/02* (2013.01)
USPC .................. 455/456.1; 455/404.2; 455/456.3; 455/414.2

(58) Field of Classification Search
CPC ... H04W 64/00; H04W 4/02; H04L 29/08657
USPC ....................... 455/456.1, 404.2, 456.3, 414.2
See application file for complete search history.

(56) References Cited

U.S. PATENT DOCUMENTS

| | | |
|---|---|---|
| 5,715,174 A | 2/1998 | Cotichini et al. |
| 5,764,892 A | 6/1998 | Cain et al. |
| 5,802,280 A | 9/1998 | Cotichini et al. |
| 6,244,758 B1 | 6/2001 | Solymar et al. |
| 6,269,392 B1 | 7/2001 | Cotichini et al. |
| 6,300,863 B1 | 10/2001 | Cotichini et al. |
| 6,507,914 B1 | 1/2003 | Cain et al. |
| 7,403,762 B2 | 7/2008 | Morgan et al. |
| 7,414,988 B2 | 8/2008 | Jones et al. |
| 7,433,694 B2 | 10/2008 | Morgan et al. |
| 7,466,986 B2 | 12/2008 | Halcrow et al. |
| 7,769,396 B2 | 8/2010 | Alizadeh-Shabdiz et al. |
| 7,818,017 B2 | 10/2010 | Alizadeh-Shabdiz et al. |
| 7,818,803 B2 | 10/2010 | Gordon |

(Continued)

OTHER PUBLICATIONS

Written Opinion issued Aug. 29, 2013 in PCT/CA2013/000475 of Absolute Software Corporation.

(Continued)

*Primary Examiner* — Nghi H Ly
(74) *Attorney, Agent, or Firm* — Knobbe, Martens, Olson & Bear, LLP

(57) ABSTRACT

A database stores results of scans for wireless (e.g., Wi-Fi) access points, some of them directly associated with GPS coordinates. Mobile electronic devices detect access points, details of which are sent to the database. Contents of the database are analyzed for relations between the scanned access points and previously stored GPS coordinates. If a relation is found, the GPS coordinates are used for determining or estimating the location of the mobile device.

20 Claims, 6 Drawing Sheets

(56) References Cited

U.S. PATENT DOCUMENTS

| | | |
|---|---|---|
| 7,945,709 B2 | 5/2011 | Cain et al. |
| 8,031,657 B2 | 10/2011 | Jones et al. |
| 8,224,934 B1 | 7/2012 | Dongre et al. |
| 8,418,226 B2 | 4/2013 | Gardner |
| 2006/0095349 A1 | 5/2006 | Morgan et al. |
| 2007/0167174 A1 | 7/2007 | Halcrow et al. |
| 2007/0232321 A1* | 10/2007 | Casati et al. ............... 455/456.1 |
| 2008/0120122 A1 | 5/2008 | Olenski et al. |
| 2009/0075672 A1 | 3/2009 | Jones et al. |
| 2009/0082036 A1* | 3/2009 | Zou et al. ................... 455/456.1 |
| 2011/0093443 A1 | 4/2011 | Alizadeh-Shabdiz et al. |
| 2011/0241872 A1 | 10/2011 | Mahaffey |
| 2011/0294516 A1 | 12/2011 | Marshall et al. |
| 2011/0317579 A1 | 12/2011 | Jones et al. |
| 2012/0200457 A1 | 8/2012 | Farrokhi et al. |

OTHER PUBLICATIONS

International Search Report issued Aug. 29, 2013 in PCT/CA2013/000475 of Absolute Software Corporation.

\* cited by examiner

SYSTEM, METHOD AND DATABASE FOR DETERMINING LOCATION BY INDIRECTLY USING GPS COORDINATES

PRIORITY CLAIM

This application claims the benefit of U.S. Provisional Appl. No. 61/645,179, filed May 10, 2012, the disclosure of which is hereby incorporated by reference.

TECHNICAL FIELD

The present disclosure relates to computer processes and databases for locating mobile electronic devices using coordinates and information associated with detected wireless (e.g., Wi-Fi) access points.

BACKGROUND

Laptops, and increasingly other electronic devices such as cell phones, PDAs, smart phones (e.g. Blackberry™, iPhone™), memory sticks, personal media devices (e.g. iPod™), gaming devices, tablet computers, electronic books and personal computers, are often remotely tracked so that, for example, they can be recovered in the event of theft, children using them can be monitored, and for other purposes. Such tracking may be effected by sending location information to a remote storage site, an email server or a personal mobile electronic device.

Furthermore, many people wish to use location based services provided through their mobile devices.

In many cases, the location of a mobile device is determined by detecting local Wi-Fi access points, retrieving locations of those access points from a database and then performing a calculation to determine the likeliest location of the mobile device. Such Wi-Fi databases are often compiled and maintained by war-driving, and include calculated locations of each access point.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below. Neither this summary, the drawings, nor the following detailed description purport to define or limit the invention.

The present disclosure relates to the locating of mobile electronic devices using systems, methods and databases that employ relations between currently detected Wi-Fi access points and previously recorded GPS coordinates of mobile devices that have detected such Wi-Fi access points. In addition, it relates to the creation, use and maintenance of such a database.

In one embodiment, a database stores scans of Wi-Fi access points, some of them directly associated with GPS coordinates. Mobile electronic devices detect Wi-Fi access points, details of which are sent to the database. Contents of the database are analyzed for relations between the scanned Wi-Fi points and previously stored GPS coordinates. If a relation is found, the GPS coordinates are used for determining the location of the mobile device.

In one embodiment, early in the process of compiling the database, Wi-Fi access points are detected by GPS-equipped mobile devices, or some other independent location technology. The GPS coordinates are stored in relation to the BSSIDs (see "Terminology" section below) of the detected access points. Whenever any of these BSSIDs are later detected by mobile devices, the GPS coordinates originally stored in relation to them are retrieved and used for determining the location of the mobile device that detects them.

If a group of Wi-Fi access points are detected that do not have a related set of GPS coordinates, they are stored as a group for later use.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

A. Terminology

A "wireless access point" is a device that allows mobile electronic devices to connect to a network such as the internet. Wireless access points can also be referred to as access points, APs, and Wi-Fi access points.

A "basic service set" ("BSS") is the building block of a wireless local area network. It typically comprises a single wireless access point together with all the wireless devices connected to it.

A "basic service set identification" ("BSSID") is an identifier for a BSS. BSSIDs are generally unique numbers. In an infrastructure BSS, the BSSID is the MAC (Media Access Control) address of the wireless access point. The term BSSID may be used interchangeably with the terms wireless access point, Wi-Fi access point and access point.

A "Wi-Fi modem" is the interface that allows a mobile device to communicate with a Wi-Fi access point.

A "cellular modem" is an interface that allows a mobile device to access a cellular telephone network.

A "scan" is the detection of wireless access points by a mobile electronic device. A scan may include none, one or more BSSIDs, each corresponding to a wireless access point.

"Trilateration" is the process of determining a location by measuring radii from three points with known positions and calculating the area where circles having the radii intersect. As the measurement is often an estimate or it contains significant errors, multilateration may be employed, where more than three known points are used. Radii, or distances from the known points, can be estimated by measuring signal strengths, for example, if the points of known position are Wi-Fi access points. Weighting of the various known positions can also be used, where the weighting is mathematically related to the signal strength. This process is often referred to as Wi-Fi triangulation.

B. System

Figure 1:
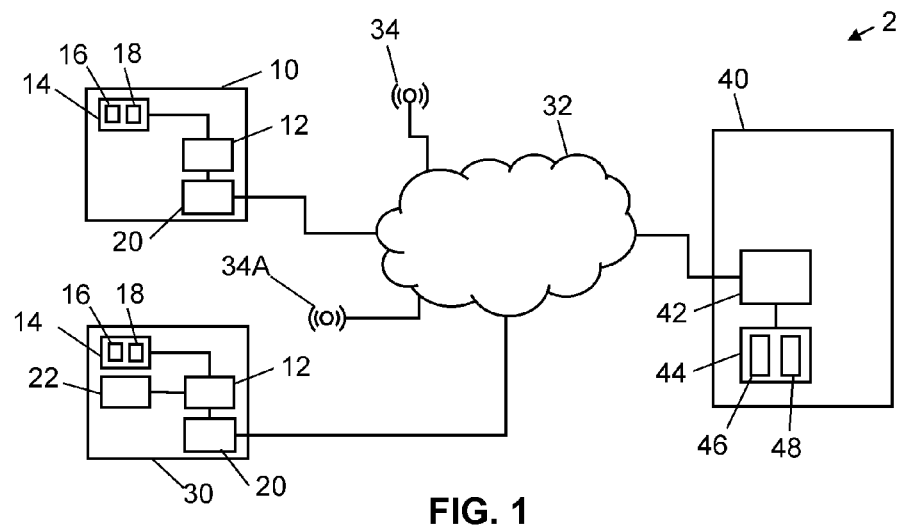
FIG. 1 is a functional block diagram of a location system in accordance with embodiments of the presently disclosed subject matter.

A basic block diagram of a preferred embodiment of the locating system 2 is shown in FIG. 1. The system includes one or more mobile devices 10 which do not have or do not use a GPS locating device. The system also includes one or more mobile devices 30 each of which uses a GPS locating device 22. Mobile devices 10, 30 generally include laptops, cell phones, PDAs, smart phones, memory sticks, personal media devices, gaming devices, tablet computers, electronic books and any other mobile electronic device. Such mobile devices 10, 30 include a processor 12, which is connected to memory 14. Memory 14 includes computer readable instructions 16 and computer readable data 18. Processor 12 reads the computer readable instructions 16 and processes them in order to provide the functions, at least in part, of the locating system 2. In doing so, the processor 12 may write data 18 to or read data 18 from the memory 14. The processor is connected to a Wi-Fi modem 20, which detects BSSIDs of local Wi-Fi access points 34, 34A. The mobile devices 10, 30 may connect to a network 32 through the Wi-Fi modems 20, although they may alternately be connected via cellular modems and a cellular network to the Internet. The network 32 may be the Internet, a cellular network or a combination of a cellular network and the Internet.

The mobile devices 10, 30 connect via network 32 to a server 40, which comprises a processor 42 and memory 44. Memory 44 contains computer readable instructions 46 and computer readable data 48 in the form of a database. Processor 42 reads the computer readable instructions 46 and processes them in order to provide the functions, of at least another part, of the locating system 2. In doing so, the processor 42 may write data 48 to or read data 48 from the memory 44. Processor 42 also communicates with processors 12 across the network 32 when determining the locations of mobile devices 10, 30.

C. Principle

Figure 2:
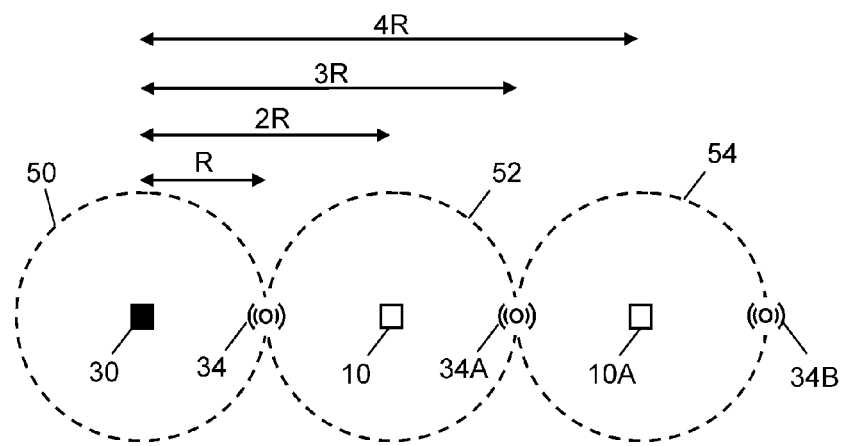
FIG. 2 is a representative diagram showing distances R-4R from a set of GPS coordinates within which different mobile devices may be located.

Referring to FIG. 2, the principle upon which the locating system 2 operates is shown. A mobile device 30, which is GPS enabled, can detect wireless access points within an area defined by surrounding circle 50 centered at its recorded GPS coordinates. The wireless access points that are most distant from the mobile device 30 but that can still be detected will lie on the circumference of the circle at a distance R from mobile device 30, and include wireless access point 34. The distance R corresponds to the radius of a scan of a mobile device, which can be assumed to be the same for all mobile devices for the purposes of the presently disclosed subject matter. Even when mobile device 30 later moves away from its location (as shown below), its GPS coordinates as then recorded will continue to be associated with wireless access point 34.

Another mobile device 10, which is not GPS enabled, detects wireless access points within surrounding circle 52. The mobile device 10 has been positioned as far as possible from GPS enabled mobile device 30, while still being able to detect wireless access point 34. It can be seen that if the mobile device 10 can detect the access point 34, then the maximum distance of mobile device 10 from the previously recorded GPS coordinates of the GPS-equipped mobile device 30 is 2R.

Mobile device 10 also detects wireless access point 34A at a maximum distance of 3R from the GPS coordinates of mobile device 30. Detection of access point 34A can also be used for determining location if detected in a scan.

A third mobile device 10A, which is not GPS-enabled, detects wireless access points 34A and 34B along the circumference of surrounding circle 54 of its scan. The third mobile device 10A has been positioned as far as possible from the GPS coordinates of mobile device 30, while still being able to detect access point 34A. It can therefore be seen that the location of mobile device 10A is within a distance 4R from the GPS coordinates of mobile device 30.

The principle may be repeated for further scans that are linked ultimately to the GPS coordinates of mobile device 30. For each subsequent link, the maximum distance from the GPS coordinates increases by 2R.

In practice, the chain of scans will not be stretched out as shown in FIG. 2, but instead will be arranged in a somewhat random walk. As a result, the most probable distance from the GPS coordinates will be considerably less than the maximum distances given above.

Scan 50 may be referred to as the reference scan, scan 52 may be referred to as an intermediate scan, and scan 54 may be referred to as a current scan or simply a scan. Each link in the chain joins two adjacent or overlapping scans with a common access point. For example, the access point 34 may be considered to be a link between the intermediate scan 52 and the reference scan 50, as it is common to both scans.

Figure 3:
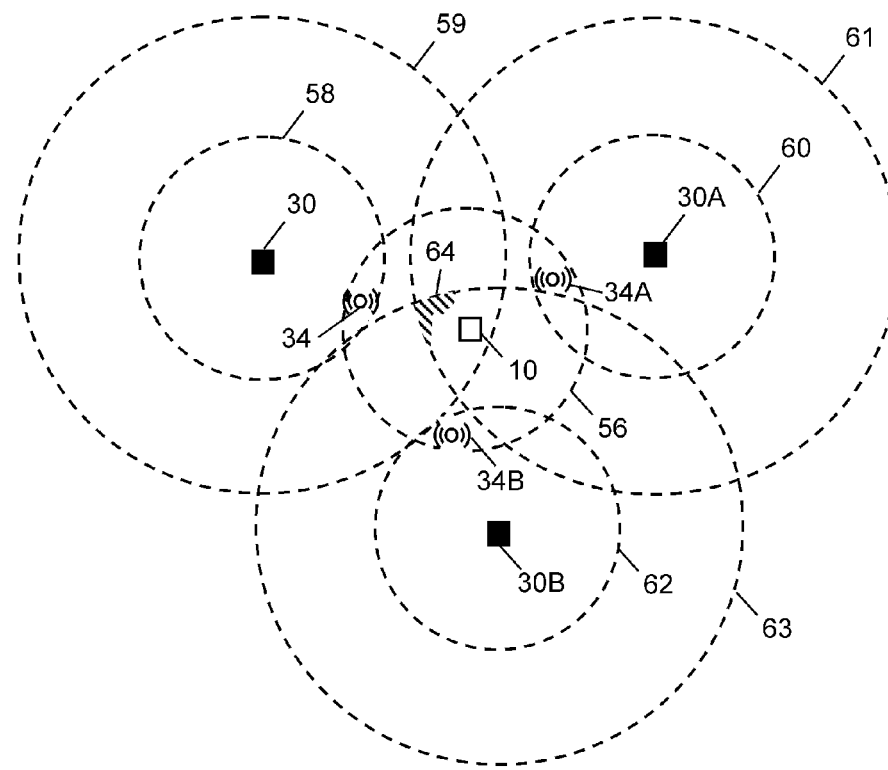
FIG. 3 is a representative diagram showing how the location of a mobile device can be calculated indirectly from GPS coordinates.

Referring to FIG. 3, one can see three GPS-enabled mobile devices 30, 30A, 30B with their respective scans 58, 60, 62. The scan 58 from mobile device 30 includes BSSID of access point 34. The scan 60 from mobile device 30A includes BSSID of access point 34A. The scan 62 from mobile device 30B includes BSSID of access point 34B. If the location of mobile device 10, which is not GPS-enabled, is required, then the mobile device 10 performs a scan 56. The scan 56 identifies wireless access points 34, 34A and 34B. Since these access points have been previously related to GPS coordinates of mobile devices 30, 30A and 30B, the location of the mobile device 10 can be calculated using these related GPS coordinates. To this end, the maximum distance from each set of GPS coordinates is 2R, as explained in relation to FIG. 2, and the location of the mobile device 10 can be calculated using a trilateration technique to be within the area 64 intersected by circles 59, 61, 63 of radius 2R centered at the GPS coordinates of mobile devices 30, 30A and 30B respectively.

It can therefore be seen that the actual coordinates of the detected access points 34, 34A, 34B do not need to be known nor calculated in order to calculate the coordinates of the mobile device 10.

Figure 4:
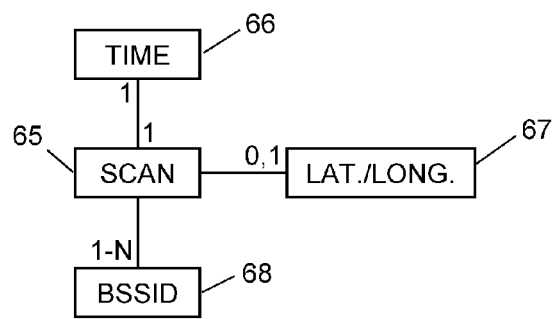
FIG. 4 diagrammatically illustrates a data structure in a database of a location system in accordance with embodiments of the presently disclosed subject matter.

FIG. 4 shows a data structure that may be used in a database of the locating system 2. For each scan 65 performed by a mobile device 10, 30 a single timestamp 66 is recorded. For each scan 65, there may be a set of coordinates 67, such as latitude and longitude coordinates 67, depending on whether the mobile device is GPS-enabled or not, whether or not a GPS enabled device has succeeded in providing a GPS fix, or whether coordinates have been associated with the location of the mobile device in some other way, either directly or indirectly. For each scan 65, there may be one set or no set of latitude/longitude coordinates 67. Each scan 65 is also related to one (e.g. N) or more BSSIDs 68, depending on how many access points are detected, and how many of these are retained for use in the system database 48.

TABLE 1 shows lines of data that may be stored in the system database 48. Looking at the first row, scan 81 is performed at a time T1 by a device that is GPS enabled. The GPS coordinates of the mobile device are stored as G71. The scan identifies BSSIDs 91, 92 and 93. Although a scan would be unnecessary for determining the location of the mobile device since it has already obtained a GPS fix, the results of the scan are useful for compiling the database 48 of the locating system 2. The determination of the location of the mobile device is therefore performed by direct usage of the GPS coordinates G71. Note that the identification of mobile device is not stored in the table in order to respect privacy. However, if permission were waived/granted by the owner or user of the device, then device identification could also be stored.

Figure 5:
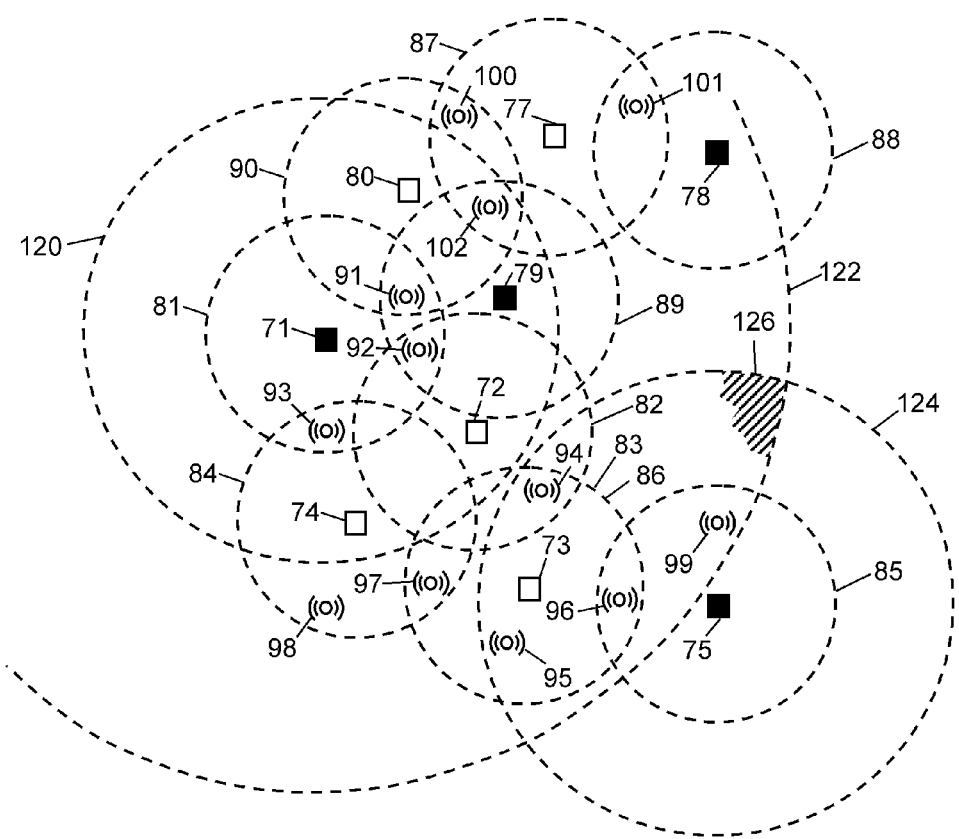
FIG. 5 is a representative diagram of a plurality of scans and how they relate to location determination in accordance with embodiments of the presently disclosed subject matter.

The first line of data can be seen diagrammatically in FIG. 5. Mobile device 71, which is GPS enabled, performs scan 81 in which it detects BSSIDs of wireless access points 91, 92 and 93. GPS coordinates G71 entered in the table are those of the mobile device 71 at the time of the scan, i.e. time T1.

TABLE 1

| Time | Scan | GPS | BSSIDs |
|------|------|-----|--------|
| T1 | 81 | G71 | 91 92 93 |
| T2 | 82 | | 92 94 |
| T3 | 83 | | 94 95 96 97 |
| T4 | 84 | | 93 97 98 |
| T5 | 85 | G75 | 96 99 |
| T6 | 86 | | 94 95 96 97 |
| T7 | 87 | | 100 101 102 |
| T8 | 88 | G78 | 101 |
| T9 | 89 | G79 | 91 92 102 |
| T10 | 90 | | 91 100 102 |

Looking at time T2 in TABLE 1, a mobile device, which is not GPS enabled, then performs scan 82, in which it detects BSSIDs 92 and 94. The scan data is added to the database. As there is no direct GPS data, the locating system 2 searches prior rows in the database to see whether either of BSSIDs 92 and 94 are related to GPS data. As it happens in this case, BSSID 92 is related to GPS coordinates G71 in the first row. The location of mobile device is therefore determined by looking it up as G71, and, since it is related to G71 indirectly, by one step, the location may be specified as being within a circle of 2R around coordinates G71.

Referring to the example provided by FIG. 5, mobile device 72, which is not GPS enabled, performs scan 82 in which it detects BSSIDs of wireless access points 92 and 94. While the actual location of mobile device 72 is shown in FIG. 5, the system 2 determines its location to be within circle 120, based only upon the first two lines of data as recorded at times T1 and T2. Circle 120 has a diameter of 2R, and is centered at the coordinates G71.

Looking at the row of data for time T3 in TABLE 1, a mobile device, which is not GPS enabled, then performs scan 83, in which it detects BSSIDs 94, 95, 96 and 97. The scan data is added to the database. As there is no direct GPS data, the locating system 2 searches prior rows in the database to see whether any of the BSSIDs 94, 95, 96 and 97 are related to GPS data. As it happens in this case, BSSID 94 is included in scan 82, which in turn is related by BSSID 92 to GPS coordinates G71 in scan 81 in the first row. The location of mobile device is therefore determined by looking it up as G71, and, since it is related to G71 indirectly, by two steps, the location may be specified as being within a circle of 4R around coordinates G71. Referring to FIG. 5, mobile device 73, which is not GPS enabled, performs scan 83 in which it detects BSSIDs of wireless access points 94, 95, 96 and 97. While the actual location of mobile device 73 is shown in FIG. 5, the system 2 determines its location to be within circle 122, based only upon the first three lines of data as recorded at times T1, T2 and T3. Circle 122 has a diameter of 4R, and is centered at the coordinates G71.

Looking at the row of data for time T4 in TABLE 1, a mobile device, which is not GPS enabled, then performs scan 84, in which it detects BSSIDs 93, 97 and 98. The scan data is added to the database. As there is no direct GPS data, the locating system 2 searches prior rows in the database to see whether any of the BSSIDs 93, 97, and 98 are related to GPS data. As it happens in this case, there are two links to prior GPS data. BSSID 97 is included in prior scan 83, which includes BSSID 94, which in turn is included in scan 82, which in its turn is related by BSSID 92 to GPS coordinates G71 in scan 81 in the first row. If this were the only link to GPS data, by three steps, the location would be specified as being within a circle of 6R around coordinates G71. However, scan 84 at T4 is related by BSSID 93 to scan 81 at T1. Since this is a single step to the same GPS data G71, it is more precise, and the location of the mobile device can be determined using the single step to be in a circle of radius 2R centered at G71. Referring to FIG. 5, mobile device 74, which is not GPS enabled, performs scan 84 in which it detects BSSIDs of wireless access points 93, 97, and 98. While the actual location of mobile device 74 is shown in FIG. 5, the system 2 determines its location to be within circle 120, based on one or more scans up to and including the time of scan 84. Circle 120 has a diameter of 2R, and is centered at the coordinates G71.

Looking at the row of data for time T5 in TABLE 1, a mobile device, which is GPS enabled, then performs scan 85, in which it detects BSSIDs 96 and 99. The scan data is added to the database. As there is direct GPS data G75, the locating system 2 adds it to the database and uses it directly as the location of the mobile device. The BSSIDs 96 and 99 are also added to the row in the database, linking them to coordinates G75. FIG. 5 shows mobile device 75, which is GPS enabled, and its scan 85 of BSSIDs 96 and 99.

Looking at the row of data for time T6 in TABLE 1, a mobile device, which is not GPS enabled, then performs scan 86, in which it detects BSSIDs 94, 95, 96 and 97. Note that these BSSIDs were previously scanned in scan 83 at time T3. However, since more related information has been added to the database since T3, the location determination is now more precise. The data for scan 86 is added to the database. As there is no direct GPS data, the locating system 2 searches prior rows in the database to see whether any of the BSSIDs 94, 95, 96 and 97 are related to GPS data. As it happens in this case, there are at least two paths linking to GPS data. Firstly, BSSID 96 is included in prior scan 85, which corresponds to GPS coordinates G75. The location of mobile device is therefore related by one step to GPS data and is determined to lie within a circle 124 (FIG. 5) of radius 2R around coordinates G75. Secondly, BSSID 97 is included in prior scan 84, which in turn is related by BSSID 93 to GPS coordinates G71 in scan 81. The location of mobile device is therefore related by two steps to GPS data G71 and is determined to lie within a circle 122 of radius 4R around coordinates G71. A calculation of the overlap of these two circles 122, 124 leads to a more precise determination of the location of the mobile device. The other path would relate the location of the mobile device via scan 83 and scan 82 to coordinates G71 of scan 81, and this being three steps would be discarded as being redundant to, and of lower precision of, the two step link to G71. Referring to FIG. 5, mobile device 73, which is not GPS enabled, performs scan 86 in which it detects BSSIDs of wireless access points 94, 95, 96 and 97. Note that a different mobile device could have been used to perform the scan, since mobile device 73 was used in a previous scan at the same location. While the actual location of mobile device 73 is shown in FIG. 5, the system 2 calculates its location to lie within the overlap area 126 of circle 122 and circle 124, based on one or more scans up to and including scan 86.

As can be seen from the preceding example, the determination of location becomes more precise as more data is added to the database.

Looking at the row of data for time T7 in TABLE 1, a mobile device, which is not GPS enabled, then performs scan 87, in which it detects BSSIDs 101, 102 and 103. The scan data is added to the database. As there is no direct GPS data, nor indirect GPS data related to any of the BSSIDs in the scan, the locating system 2 does not determine a location for the mobile device. The scan, however, is recorded, as it may later be useful for linking following scans to GPS data. FIG. 5 shows mobile device 77, which is not GPS enabled, and its scan 87 of BSSIDs 100, 101 and 102.

Looking at the row of data for time T8 in TABLE 1, a mobile device, which is GPS enabled, then performs scan 88, in which it detects BSSID 101. The scan data is added to the database. As there is direct GPS data G78, the locating system 2 adds it to the database and uses it directly as the location of the mobile device. The BSSID 101 is also added to the row in the database, linking it to coordinates G78. FIG. 5 shows mobile device 78, which is GPS enabled, and its scan 88 of BSSID 101.

Looking at the row of data for time T9 in TABLE 1, a mobile device, which is GPS enabled, then performs scan 89, in which it detects BSSIDs 91, 92 and 102. The scan data is added to the database. As there is direct GPS data G79, the locating system 2 adds it to the database and uses it directly as the location of the mobile device. The BSSIDs 91, 92 and 102 are also added to the row in the database, linking them to coordinates G79. FIG. 5 shows mobile device 79, which is GPS enabled, and its scan 89 of BSSIDs 91, 92 and 102.

Looking at the row of data for time T10 in TABLE 1, a mobile device, which is not GPS enabled, then performs scan 90, in which it detects BSSIDs 91, 100 and 102. The scan data is added to the database. As there is no direct GPS data, the locating system 2 searches prior rows in the database to see whether any of the BSSIDs 91, 100, and 102 are related to GPS data. BSSIDs 91 and 102 are included in prior scan 89, which in turn is related directly to GPS coordinates G79. BSSID 91 is also included in prior scan 81, which in turn is related directly to GPS coordinates G71. BSSID 100 is included in prior scan 87, which in turn is related by BSSID 101 to scan 88, with GPS coordinates G78. The location of the mobile device performing scan 90 therefore lies within the overlap of a circle of radius 2R centered at G79, a circle of radius 2R centered at G71, and a circle of radius 4R centered at G78. This calculation is an example of how a scan 87, from which location cannot be determined at time T7, can be used for determining location at later times. FIG. 5 shows mobile device 80, which is not GPS enabled, and its scan 90 of BSSIDs 91, 101 and 102.

Figure 6:
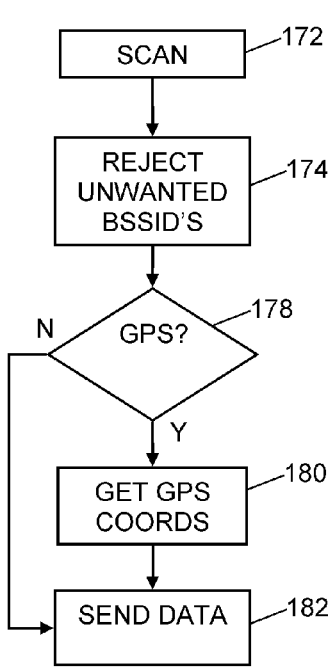
FIG. 6 is a flowchart of a process a mobile device performs during determination of its location in accordance with embodiments of the presently disclosed subject matter.

FIG. 6 is a flowchart of a process a mobile device performs during determination of its location. This process may be embodied in program code stored on and executed by the mobile device, and/or may be implemented in application-specific circuitry of the mobile device. Before the process starts, the device receives a request to start a scan. The request may be initiated by an application on the device, by a user of the device, by a server 40 or by another remote computer. An application within the device may request the device's location, for example, but there are other reasons why a scan may be requested, such as for the building of a database of scans. The device in step 172 performs a scan to determine the BSSIDs of Wi-Fi access points that are in range of the device. Depending on the type and number of BSSIDs detected, some may be rejected by the device in step 174. For example, all BSSIDs of other mobile devices are rejected and BSSIDs of peer-to-peer devices are rejected. If there is a large number of BSSIDs remaining, the device may reject all but the strongest ten, for example, or some other number that is deemed to be appropriate. Provided that a sufficient, usually small, number of BSSIDs have been detected, there is not much further gain in accuracy if further BSSIDs are used, but there is a significant slow down in processing time for determining the location of the device. The device detects whether it is GPS enabled or not in step 178, and if it is, in step 180 it gets the current GPS coordinates of the device. Step 180 is skipped if the device is not GPS enabled, or if the device is enabled but cannot retrieve its GPS coordinates within a reasonable time. In step 182, the device sends the data to the server 40, either immediately, periodically, from time to time, whenever a connection is next available, or when a certain number of scans have been performed. The data includes the filtered scan results and, if obtained, the GPS coordinates. The data stored at the server 40.

If, for example, the scan was performed as a result of a request for the location of the device, and there is no GPS capability on the device, then the data sent in step 182 may be analyzed at the server 40 to determine a location for the device, to which would then be sent the determined location from the server. In another example, where the server 40 is configured to track the device, the determined location would not necessarily be sent back to the device.

Note that some of the steps in FIG. 6 may be performed in a different order in different embodiments. Some steps may be omitted depending on the embodiment.

Figure 7:
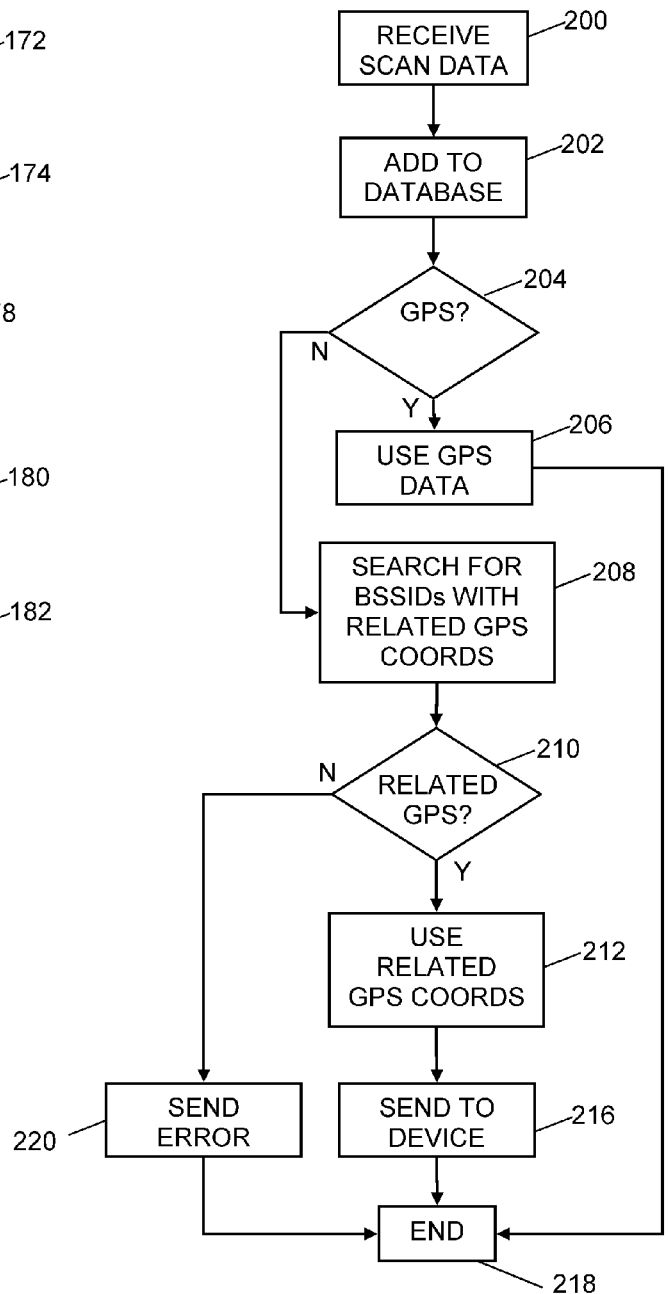
FIG. 7 is a flowchart of a process a server performs when determining the location of a mobile device in accordance with embodiments of the presently disclosed subject matter.

FIG. 7 is a flowchart of a process the server 40 performs when determining the location of a mobile device. (The server 40 may be composed of multiple distinct physical computers or computing devices that communicate via a network, or may be implemented as a single physical computer/machine.) In step 200 the server 40 receives a scan of location data, which includes one or more BSSIDs and optionally GPS coordinates. In step 202, the server adds the location data to the database. The server determines in step 204 whether the location data includes GPS data. If GPS data is included, the process uses the GPS data in step 206 and then ends in step 218. If the GPS data is not included, the server searches for previously detected scans that have related GPS coordinates in step 208. If in step 210 the server does not find data related to GPS coordinates, the process may optionally send an error report to the device in step 220, before ending, in step 218. If, however, the server finds GPS coordinates that are related to the scan, then the related GPS coordinates are used in step

212. The server may perform calculations on the identified GPS data to calculate a location, it may log the location in a tracking database, and it may send, in step 216, the calculated or otherwise determined location back to the mobile device that sent the scan to the server, before ending in step 218.

Figure 8:
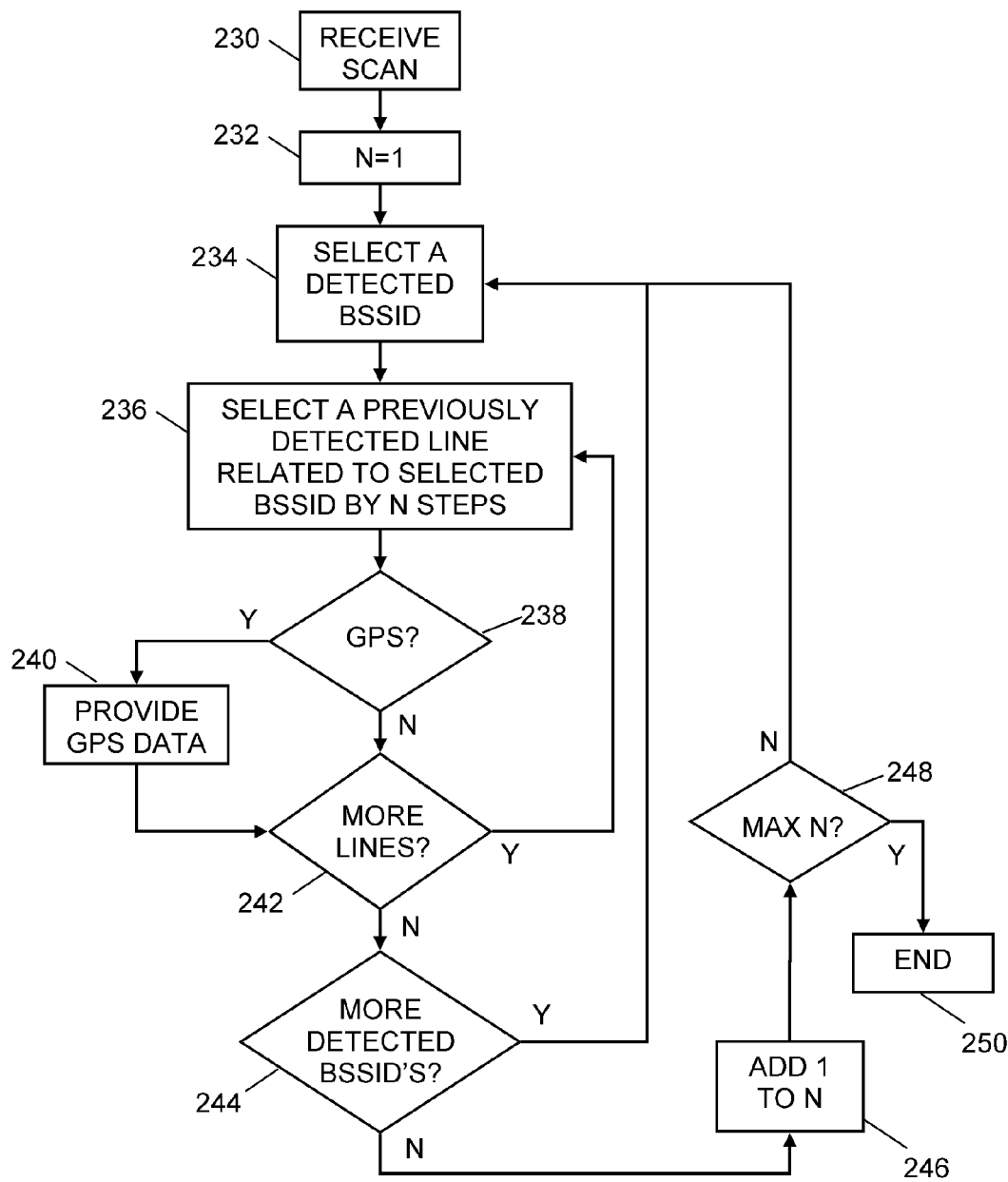
FIG. 8 is a flowchart of a process performed by a server when searching for GPS data that is related to a scan in accordance with embodiments of the presently disclosed subject matter.

FIG. 8 is a flowchart of a process performed by the server 40 when searching for GPS data that is related to a scan. After receiving a scan of BSSIDs in step 230 and adding it to the database, the server, in step 232, sets a variable N=1 to represent the number of steps relating the set of BSSIDs just received to a previously detected line already stored in the database. The server then selects one of the detected BSSIDs from the scan in step 234. The server then looks for and selects 236 a preceding line in the database corresponding to an earlier scan which included the selected BSSID. Such a preceding line would be related to the currently scanned line by one step.

If, in step 238, the preceding line includes GPS coordinates, then the GPS coordinates are provided in step 240 to a function that uses the GPS coordinates for calculating a location. In a simple case, the function may simply use the first set of GPS coordinates it receives. In more complex cases, the function may wait until more sets of GPS coordinates have been provided in order to calculate a weighted or average location. The GPS data stored in the database may include corresponding signal strengths detected, which can be used for weighting calculations. If more set of GPS coordinates are desired, then the process continues to step 242.

If, in step 238, there are no GPS coordinates associated with the previously detected line, then the process moves to step 242.

In step 242, the server determines whether there are any more preceding lines to be searched. If so, the process loops back to step 236 to select another preceding line having the selected BSSID. If, in step 242, there are no more preceding lines, then the process determines in step 244 whether there are more BSSIDs detected in the scan. If so, the process loops back to step 234, where another BSSID is selected from the scan. If there are no more BSSIDs in the scan and none have corresponding GPS coordinates in a preceding row, this means that there are no one-step relations between the scan and previously stored GPS coordinates.

The server then looks for two-step relations. This may occur even if one-step relationships have been found. In step 246, the server increments the value of N by one. This step may be repeated more than once, and it may be desirable to limit the maximum value of N, since the accuracy of a GPS fix that is related to a current scan decreases as the number of steps in the relation increases. If, in step 248, the maximum value of N is reached, the process ends, in step 250. If the maximum value of N has not been reached, the process reverts back to step 234, in which one of the scanned BSSIDs is selected. In the following step 236, the server selects a previously detected line from the database which is related to the scanned line by two steps. By this it is meant that an intervening line includes a first BSSID in common with the scanned line and a second BSSID in common with the previously detected line, without the scanned line and previously detected lines having any BSSIDs in common.

The next time round, when N=3, the previously detected line will be related to the currently scanned line by 3 steps. In this case, there will be two intervening lines. The first intervening line will have one BSSID in common with the scanned line and a second BSSID in common with the other intervening line. The other intervening line will also have a BSSID in common with the previously detected line.

The process continues, and may be stopped at any point depending on how it is configured. As before, steps in the flowchart may be performed in a different order to that illustrated, or they may be combined where shown separately.

Figure 9:
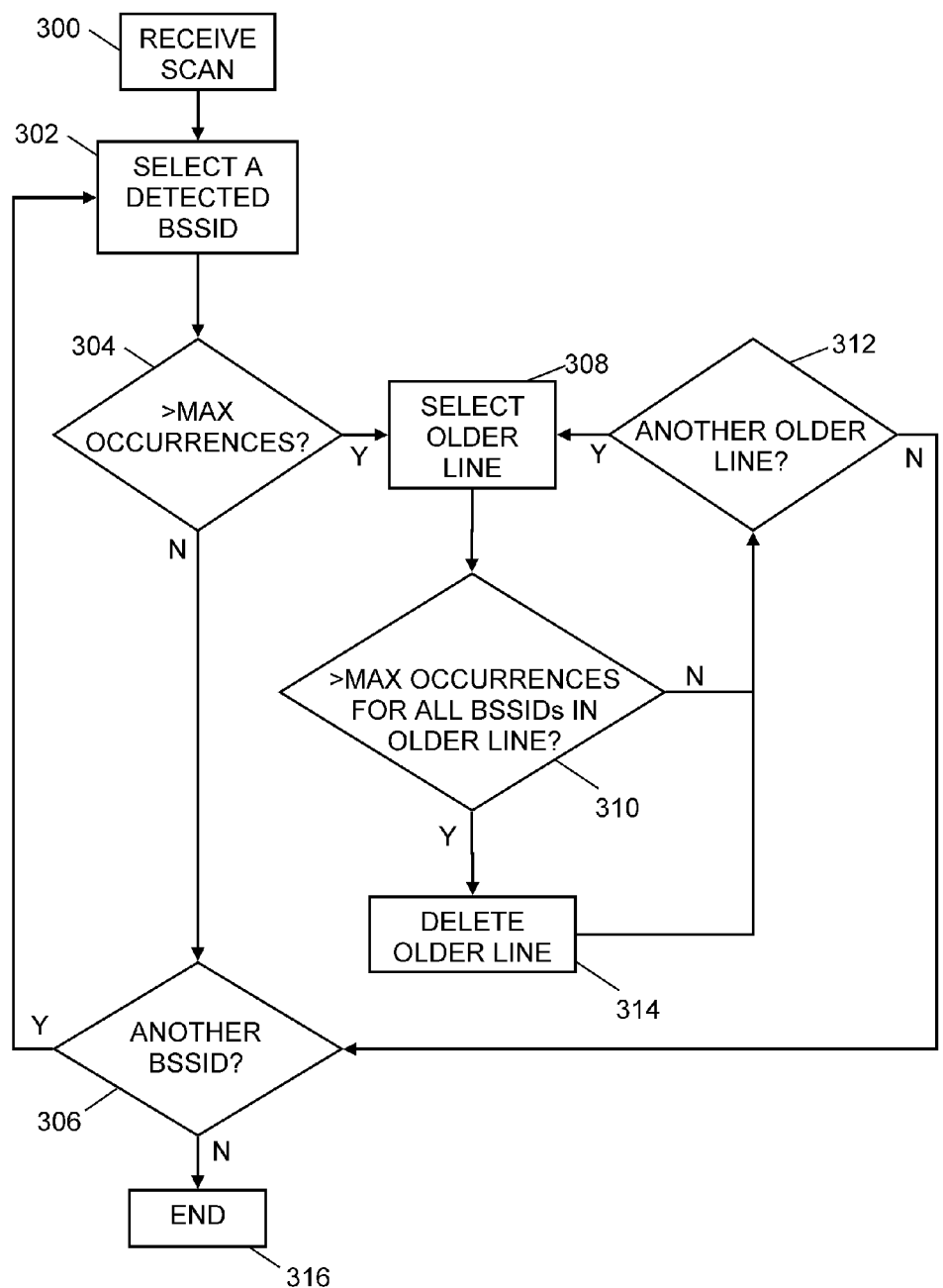
FIG. 9 is a flowchart for maintaining a database at an efficient size in accordance with embodiments of the presently disclosed subject matter.

Referring to FIG. 9, a flowchart is shown for maintaining the database to an efficient size. This process may be implemented by the server 40 via execution of program code. It is important for the efficiency of operation of the database, although not necessarily critical, to delete old or redundant data, or to limit the amount of data for any one BSSID. One way of doing this is to regularly examine the database for opportunities to delete data. This may be done, for example, upon the receipt by the database of each new scan. In step 300, the server receives a new scan and enters it in the database. From this scan, one of the detected BSSIDs is selected, in step 302. The server determines, in step 304, whether the selected BSSID occurs more than a set maximum number of times in the database. If so, there is an opportunity to remove old data. If the selected BSSID does not occur more than the set maximum number of times, then if there is another BSSID in the scan, in step 306, the process reverts to step 302, in which another BSSID from the scan is selected.

In step 308, starting from the oldest line first, an older line that also contains the selected BSSID is selected. While the older line is redundant with respect to the selected BSSID, it may not be redundant with the other BSSIDs it may contain. If, in step 310, all the BSSIDs in the older line have greater than the maximum set number of occurrences throughout the database, then the older line is redundant, and is deleted in step 314. After this, or if the older line is not redundant, the process moves to step 312, where the server determines whether there is another older line having the selected BSSID. If there is another older line, the older line is selected in step 308, and the process is repeated for it. If, in step 312, there are no more older lines having the selected BSSID, the process moves to step 306, where it is determined whether there are any more BSSIDs in the scan that have not been analyzed. If not, the process ends at step 316. If there is another BSSID, then the process reverts back to step 302, where another BSSID from the scan is selected.

The application that runs on the device may be supported by an agent. An agent, as used herein, is a software, hardware or firmware agent that is ideally persistent and stealthy, and that resides in the mobile device. The agent provides servicing functions which require communication with a remote server. The agent is tamper resistant and can preferably be enabled for supporting and/or providing various services such as data delete, firewall protection, data encryption, location tracking, message notification, software deployment and updates. An illustrative embodiment of an agent is found in the commercially available product Computrace Agent™ The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; 6,507,914; 7,818,803; 7,945,709 and related foreign patents. Details of the persistent function of an agent are disclosed in U.S. Patent Application Publication No. US2005/0216757 and U.S. Pat. No. 8,418,226. The technical disclosures of these documents are fully incorporated by reference. It is feasible to use an equivalent agent to the Computrace Agent™, or less preferably an alternative agent with less functionality could be used. For the purposes of the present disclosure, the minimum functional attribute of the agent would be to facilitate communications between the electronic device and a monitoring center or other remote computer or server. Communications may be initiated by the agent, by the monitoring center, or by both.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. In general, unless otherwise indicated, singular elements may be in the plural and vice versa with no loss of generality. The use of the masculine can refer to masculine, feminine or both. Drawings are not to scale.

All of the methods and processes described above may be embodied in, and fully automated via, software code modules executed by one or more computing devices. The code modules may be stored in any type(s) of computer-readable media or other computer storage system or device (e.g., hard disk drives, solid state memories, etc.) The methods may alternatively be embodied partly or wholly in specialized computer hardware, such as ASIC or FPGA circuitry. The results of the disclosed methods and tasks may be persistently stored by transforming physical storage devices, such as solid state memory chips and/or magnetic disks, into a different state.

The present description is of the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

The invention claimed is:

1. A method of estimating locations of mobile devices, comprising:
   receiving scan results of a first scan performed by a first mobile device, said scan results including Global Positioning System (GPS) coordinates of the first mobile device and including a first set of one or more access point identifiers, each access point identifier corresponding to a respective access point located in the first scan;
   receiving scan results of a second scan performed by a second mobile device, said scan results of the second scan excluding coordinates of the second mobile device and including a second set of one or more access point identifiers, each of which corresponds to a respective access point located in the second scan;
   detecting that the scan results of the first and second scans overlap by at least one access point;
   estimating a location of the second mobile device to be within a first distance of the GPS coordinates;
   receiving scan results of a third scan performed by a third mobile device, said scan results of the third scan excluding coordinates of the third mobile device and including a third set of one or more access point identifiers, each of which corresponds to a respective access point located in the third scan;
   detecting that the scan results of the second and third scans overlap by at least one access point;
   detecting that the scan results of the first and third scans do not overlap; and
   estimating a location of the third mobile device to be within a second distance of the GPS coordinates, the second distance being larger than the first distance;
   said method performed programmatically by a computing system.

2. The method of claim 1, wherein estimating the location of the second mobile device comprises determining a boundary of a zone in which the second mobile device is estimated to be located.

3. The method of claim 2, wherein the boundary is determined at least partly using trilateration.

4. The method of claim 1, wherein the second distance is double the first distance.

5. The method of claim 1, further comprising sending the estimated location of the second device to the second device.

6. The method of claim 1, further comprising sending the estimated location of the third device to the third device.

7. The method of claim 1, further comprising:
   using the estimated location of the third device with another estimated location of the third device to calculate a weighted or average location; and
   sending an indication of the weighted or average location to the third device.

8. The method according to claim 1, wherein the first, second or third set of access point identifiers includes identifiers for less than all access points in the first, second or third scan respectively.

9. The method of claim 8, wherein the included identifiers are for access points with strongest signal strengths.

10. The method of claim 8, wherein the first, second and third sets of access point identifiers exclude identifiers of mobile devices and peer-to-peer devices.

11. The method of claim 1, further comprising storing the scan results of the first, second and third scans in a database.

12. The method of claim 11, further comprising storing timestamps with the scan results.

13. The method of claim 11, wherein the database stores multiple first, second and third scan results from multiple first, second and third mobile devices, and the method further comprises:
   determining that all access point identifiers in scan results of a given scan are each present in the database more than a set maximum number of times; and
   deleting from the database the scan results of the given scan.

14. Non-transitory computer storage that stores executable program instructions that direct a computing system to perform a process that comprises:
   receiving scan results of a first scan performed by a first mobile device, said scan results including Global Positioning System (GPS) coordinates of the first mobile device and including a first set of one or more access point identifiers, each access point identifier corresponding to a respective access point located in the first scan;
   receiving scan results of a second scan performed by a second mobile device, said scan results of the second scan excluding coordinates of the second mobile device and including a second set of one or more access point identifiers, each of which corresponds to a respective access point located in the second scan;

detecting that the scan results of the first and second scans overlap by at least one access point;

estimating a location of the second mobile device to be within a first distance of the GPS coordinates;

receiving scan results of a third scan performed by a third mobile device, said scan results of the third scan excluding coordinates of the third mobile device and including a third set of one or more access point identifiers, each of which corresponds to a respective access point located in the third scan;

detecting that the scan results of the second and third scans overlap by at least one access point;

detecting that the scan results of the first and third scans do not overlap; and estimating a location of the third mobile device to be within a second distance of the GPS coordinates, the second distance being larger than the first distance.

15. The non-transitory computer storage of claim 14, wherein estimating the location of the second mobile device comprises determining a boundary of an zone in which the second mobile device is estimated to be located.

16. The non-transitory computer storage of claim 15, wherein the boundary is determined at least partly using trilateration.

17. The non-transitory computer storage of claim 14, wherein the second distance is double the first distance.

18. The non-transitory computer storage of claim 14, wherein the process further comprises:

sending the estimated location of the second device to the second device; and sending the estimated location of the third device to the third device.

19. The non-transitory computer storage of claim 14, wherein the process further comprises storing the scan results of the first, second and third scans in a database.

20. The non-transitory computer storage of claim 19, wherein the database stores multiple first, second and third scan results from multiple first, second and third mobile devices, and the process further comprises:

determining that all access point identifiers in scan results of a given scan are each present in the database more than a set maximum number of times; and deleting from the database the scan results of the given scan.

* * * * *